United States Patent Office 3,504,782
Patented Apr. 7, 1970

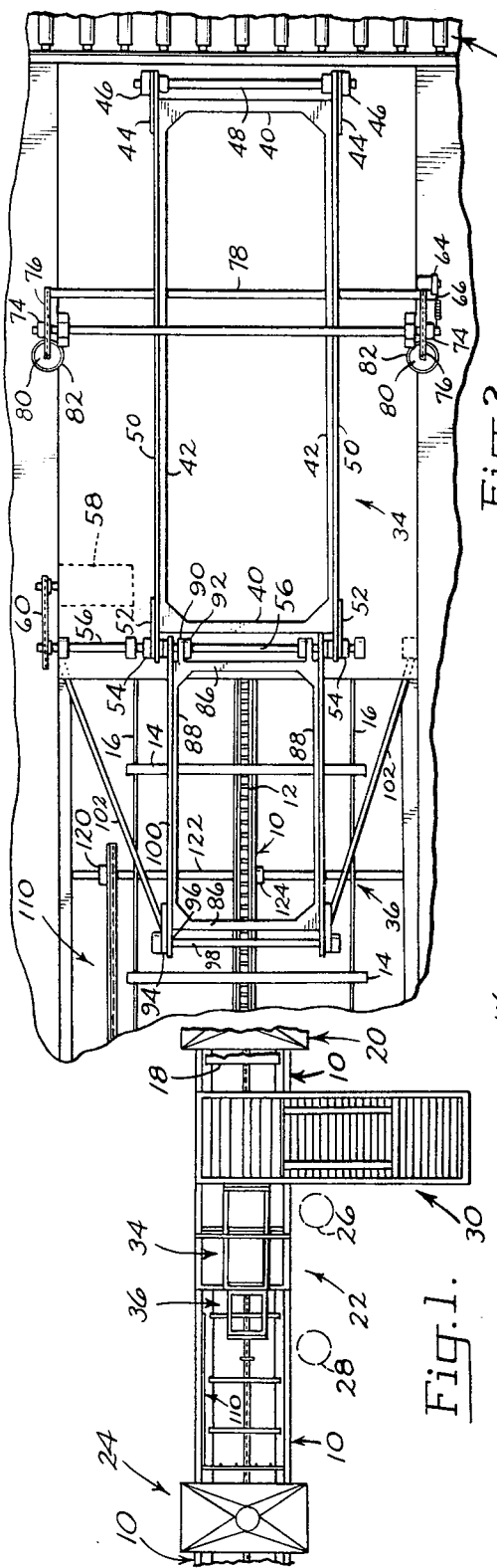

3,504,782
APPARATUS FOR LOADING STIFF SHEET
MATERIAL ON MOVING CONVEYERS
Robert J. Slagle, Springfield, James P. Petermann,
Eugene, and Russell W. Wilson and Leslie M.
Steffensen, Springfield, Oreg., assignors to Georgia-
Pacific Corporation, Portland, Oreg., a corpora-
tion of Georgia
Filed Nov. 17, 1967, Ser. No. 683,873
Int. Cl. B65g 37/02, 47/02, 59/02
U.S. Cl. 198—29                            7 Claims

ABSTRACT OF THE DISCLOSURE

Apparatus for loading sheet material on a primary conveyer moving horizontally at a predetermined rate comprises a sectional loading conveyer arranged above the primary conveyer and aligned therewith. The upstream section is pivotally mounted so that its upstream end oscillates between raised and lowered positions. Indexing means adjust its upstream end to a level corresponding to the level of a stack of sheets fed one at a time. The upstream feeds the sheets to the downstream section which, in turn, feeds them to the primary conveyer. Sheet alignment abutment means are associated with the primary conveyer for aligning the sheets.

This invention relates to loading apparatus for use in loading sheet material on a primary conveyer moving at a predetermined rate in a substantially horizontal plane. It pertains particularly to apparatus for loading core veneers on face veneers when laying up veneer assemblies to be pressed into plywood.

In various industrial operations the necessity frequently arises for loading sheet material on a rapidly moving conveyer, in registration with sheet material already present on the conveyer, without disturbing the first sheets and without damaging either the first sheets or those being superimposed.

A typical instance is to be found in laying up plywood veneers into assemblies to be pressed into plywood. In this application, face veneers are placed one at a time on a rapidly moving conveyer. Glue is applied to the backs of the face veneers. Core veneers are superimposed on the adhesive-coated upper surfaces of the face veneers. Adhesive is applied to the upper surfaces of the core veneers. Back veneers then are superimposed on the adhesive-coated surfaces of the core veneers to form the completed assembly.

These various operations are carried out at a sequence of loading stations along a rapidly moving conveyor belt. The presently described loading apparatus is designed for use, for example, in laying the core veneers on the adhesive-coated face veneers.

It accordingly is the general object of the present invention to provide apparatus for loading core veneers and like sheet materials onto a moving conveyer, rapidly, accurately and without damaging the sheets.

In the drawings:

FIG. 1 is a fragmentary schematic view in plan of a plywood-layup line including the herein described sheet-loading apparatus;

FIGS. 2 and 3 are views in side elevation and plan, respectively, of the sheet loading apparatus;

FIGS. 4 and 5 are fragmentary views in plan and elevation, respectively, illustrating sheet aligning means incorporated in the herein described sheet loading apparatus; and FIG. 6 is a transverse sectional view taken along line 6—6 of FIG. 5.

In its broad aspect, the sheet loading apparatus of our invention comprises a sectional loading conveyer superimposed above an aligned primary conveyer traveling in a horizontal plane. The upstream section is pivoted at its downstream end for oscillating movement in a vertical plane as required to bring its upstream or feed end in working relation with a nearby stack of sheets. Suitable indexing means such as pawl and ratchet means, or indexing hydraulic cylinder means, are connected to the upstream section to index its swinging end as required to maintain it adjacent the upper sheets of the stack.

Suitable counterweighting may be applied to the upstream loading conveyer section to assist in the indexing operation.

The upstream loading section transmits the sheets to a downstream section which is fixed and passes the sheets to the primary conveyer.

Aligning means are located immediately downstream of the loading conveyer assembly for aligning the side edges of the sheets as they are fed onto the primary conveyer. This may be done, for example, in order to align the side edges of the freshly loaded sheets with the side edges of underlying sheets already present on the primary conveyer.

Thus sheets in the stack may be placed one at a time on the registering upstream end of the upstream loading conveyer section whereupon they are conveyed down along the upstream section, along the communicating downstream section, and thence onto the primary conveyer, where they are aligned laterally against the aligning abutment.

In FIG. 1 the number 10 indicates generally a primary conveyer used to transport sheet material. The conveyer may be of any suitable type but, as shown in FIG. 3, may preferably comprise an endless chain 12, mounting elongated transverse flights 14 which ride on supporting tracks 16.

The primary conveyer thus constituted is designed to carry sheets of material such as plywood face sheets 18, past a plurality of processing stations. It may convey them past a first glue spray station 20, past a core veneer loading station 22, past a second glue spray station 24 and thence to a back veneer loading station not illustrated.

The present invention has to do with station 22 at which core veneers are superimposed upon the upper surfaces of face veneers already loaded on primary conveyer 10.

Station 22 is designed to accommodate two operators, i.e. an operator at location 26, who loads the veneers, and an operator at location 28, who arranges and aligns them. It also includes a transverse side conveyor 30 designed to introduce and support in working position stacks 32 of core veneers which are to be loaded onto the primary conveyer.

The core veneer may comprise strips of uniform length clipped to random width as required by the presence of knots, imperfections and other defects inherently present in the continuous wood sheets which are their source.

The herein described loading apparatus for loading the core veneer sheets on the primary conveyer, specifically on top of face veneer sheets 18 previously loaded on the primary conveyer, is illustrated in FIGS. 2 and 3.

The loading apparatus essentially comprises a pair of communicating, aligned, and cooperating loading conveyer sections superimposed above the primary conveyer. The upstream or first section, indicated generally at 34, oscillates in a vertical plane as required to bring its upstream end in registration with the top of stack 32. The downstream or second section, indicated generally at 36, is fixed as required to place its downstream discharge end a fixed and predetermined distance above the primary conveyer.

Up stream conveyor section 34 comprises a rectangular frame comprised of end pieces 40 interconnected by side rails 42. The upstream ends of side rails 42 carry longitudinal extensions 44 mounting bearings 46 in which is journaled a shaft 48 mounting idler pulleys which carry endless belts 50. The working upper stretches of the latter are backed up and supported by side rails 42 of the frame.

The downstream end of the frame of loading conveyor section 34 mounts longitudinal extensions 52 which support bearings 54. A drive shaft 56 is journaled in the bearings. Drive pulleys mounting the downstream ends of endless belts 50 are splined to the drive shaft.

The drive shaft is driven at a suitable speed by means of a motor 58 connected through a chain and sprocket assembly 60 to an outwardly projecting end of the drive shaft.

Bearings 54, which support the frame of conveyer section 34, also mount it for oscillation in a vertical plane, as shown by the full and dotted line positions of FIG. 2. In the elevated or dotted line position, the infeed end is placed adjacent the top of sheet stack 32 so that an operator standing at station 26 conveniently may transfer the sheets one at a time to the conveyer. However, as the stack is depleted, its top sheet obviously will lie at levels of decreasing elevation. Indexing means are provided for lowering the conveyer section progressively and correspondingly.

One such means comprises pawl and ratchet means including a ratchet 64 fixed to a frame member and extending upwardly therefrom. A cooperating pawl 66 is mounted on the frame of the conveyer. The pawl is arranged to engage the rounded teeth of the ratchet and maintain the conveyer in a selected position of elevation.

An alternate indexing means may comprise an indexing hydraulic cylinder 70, the case and piston rod of which pivotally are connected, respectively, to a stationary member and the frame of the oscillating conveyer section.

Counterweight means cooperate with the indexing means by facilitating raising and lowering the unit.

In the illustrated form of the invention the counterweight means comprise a pair of vertical standards 72 mounted one on each side of the upstream loading conveyer section and extending to a level preferably more elevated than the maximum position of desired elevation of the conveyer. Each standard rotatably mounts a sprocket 74 arranged in a vertical plane. The sprocket in turn meshes with a chain length 76.

One end of the chain length is pinned to a transverse rod 78 which spans side rails 42 and extends outwardly therefrom. The other end of the chain is connected to a counterweight 80 which moves in a hollow guide 82. Counterweight 80 has sufficient weight slightly to overbalance the weight of the oscillating conveyor, so that it normally works against pawl 66 of the ratchet assembly.

The second or downstream loading conveyer section 36, which coperates with the upstream section just described, in contradistinction does not oscillate but is fixed in its position. This places its downstream, discharge end at a fixed and constant elevation above primary conveyer 10, as required to load the sheets in a precisely determined location.

Downstream loading conveyer 36 is mounted on a rectangular frame including end pieces 86 and side rails 88. The frame mounts upstream extensions 90 to which are fixed bearings 92. The latter journal drive shaft 56.

The frame also has downstream extensions 94 which support bearings 96. The latter journal a shaft 98. Drive pulleys are keyed to drive shaft 56 and idler pulleys are mounted on shaft 98. Drive belts 100 are reeved about the pulleys. The entire assembly is rigidified by a pair of struts or braces 102, interconnecting the frame of the loading conveyer and the stationary frame of the primary conveyer.

The sheets passing down communicating loading conveyer sections 34, 36 are deposited thereby on primary conveyer 10 in a desired loading position. Means further are provided, however, for aligning the sheets laterally so that their edges are aligned with the edges of previously deposited sheets upon which they have been loaded. The aligning means for accomplishing this purpose is illustrated in FIGS. 2 and 3, and, particularly in FIGS. 4, 5 and 6.

The aligning means employed basically comprises an abutment wall or straight edge moving at substantially the same rate as the primary conveyer against which the sheets may be pressed endwise to align them.

The aligning unit, indicated generally at 110, comprises an endless chain made up of a plurality of links pivotally interconnected. Selected links, all of the links in the illustrated embodiment, have a vertical side plate aligned with the side plates of the companion links to form an interrupted or continuous abutment wall, as the case may be.

Thus as is shown in FIGS. 4, 5 and 6, the chain may comprise a combination of inner side plates 112, outer overlapped side plates 114 on one side of the chain and overlapped extened side plates 116 on the other side of the chain, all interconnected by transverse pins 118.

Extended side plates 116 extend outwardly from the chain normal to its plane a sufficient distance to form an aligning abutment wall.

The chain is driven synchronously with primary conveyer 10 by a suitable drive which may comprise, for example, drive sprockets 120 keyed to a drive shaft 122 to which also is keyed one of the drive sprockets 124 by means of which primary conveyer chain 12 is driven.

OPERATION

The operation of the presently described sheet loading apparatus is as follows:

Primary conveyer 10 is set in motion. A sheet 18 such as a plywood face sheet is loaded on the conveyer. The sheet is passed to station 22 where core veneer sheets are superimposed. The core veneers sheet are maintained in working position on transverse conveyer 30 in a stack 32.

The operator indexes the upstream loading section of the conveyer, 34, to its upper position by actuation of ratchet 64 and associated pawl 66, or in the alternative, by means of indexing cylinder 70. He then manually transfers the sheets one at a time to belts 42 which convey them downwardly to the downstream loading conveyer section 36. As the work progresses and stack 32 becomes depleted, the upstream conveyer is indexed downwardly by suitable working increments.

The downstream conveyer, being a fixed distance above primary conveyer 10, deposits the sheets thereon in a desired location on underlying sheet 18. An operator at operating location 28 manually places them edge to edge and abuts them against the abutment plates 116 of endless aligning chain 110. Since this is run at a speed synchronized with the speed of main conveyer 10, the alignment may be accomplished rapidly and easily.

There thus is provided apparatus which makes possible loading sheet materials in a precise location on a moving conveyer, or on sheets previously mounted thereon, in a predetermined location, precisely aligned with each other, without damaging the sheets, and at a rate suited to the laying up of plywood veneers into press assemblies and similar applications.

It is to be understood that the form of our invention herein shown and described is to be taken as an illustrative example of the same and that various changes in the shape, size and arrangement of parts may be resorted to without departing from the spirit of our invention.

Having thus described our invention, we claim:

1. For use in loading stiff sheet material on a primary conveyor moving at a predetermined rate on a substantially horizontal plane, loading apparatus comprising, in combination with a primary conveyor:
   (a) a first loading conveyor section positioned above the primary conveyor in substantial axial alignment therewith,
   (b) pivotal mounting means mounting the downstream end of the first section for oscillation in a vertical plane,
   (c) a second loading conveyor section downstream from and communicating with the first section, in substantial alignment therewith,
   (d) the downstream end of the second section being spaced vertically a predetermined distance above the primary conveyor,
   (e) drive means connected to the first and second loading conveyor sections for driving them both in unison at a linear speed coordinated with the linear speed of the primary conveyor,
   (f) work support means stationed above the primary conveyor adjacent the upstream end of the first section for supporting a stack of sheets to be fed one at a time thereto, and
   (g) indexing means connected to the first section and operative to adjust its upstream ends successively to elevations corresponding to the elevations of the uppermost sheets on the stack.

2. The loading apparatus of claim 1 wherein the first and second loading conveyor sections comprise endless belts arranged end to end and driven in unison, at the same linear speed.

3. The loading apparatus of claim 1 wherein the indexing means comprise a pawl and a cooperating ratchet, one being fixed to the first loading conveyor section and the other to a stationary frame member.

4. The loading apparatus of claim 1 wherein the indexing means comprises an indexing hydraulic cylinder interconnecting the first loading conveyor section and a stationary frame member.

5. The loading apparatus of claim 1 including sheet aligning abutment means extending longitudinally of the primary conveyor downstream from the loading conveyor.

6. The loading apparatus of claim 5 wherein the sheet aligning abutment means comprises an endless chain including a plurality of pivotally interconnected links, selected links including a vertically extending side plate aligned with the like side plates of companion links to form a straight edge abutment wall, and drive means connected to the endless chain for driving the same at a linear speed substantially equal to the linear speed of the primary conveyor.

7. In apparatus for loading sheet material on a moving primary conveyor, the combination with a moving primary conveyor of a sheet aligning unit for aligning sheets thus loaded, comprising:
   (a) an endless chain comprising a plurality of pivotally interconnected links,
   (b) vertical side plates on selected links in substantial alignment with each other to form a straight abutment wall against which the edges of the sheets may be pressed to secure their alignment,
   (c) drive means connected to the endless chain for driving it at a linear speed substantially the same as the linear speed of the primary conveyor, and
   (d) mounting means mounting the working stretch of the endless chain at a level at which the abutment wall is substantially coplanar with the sheets on the primary conveyor.

References Cited

UNITED STATES PATENTS

| | | | |
|---|---|---|---|
| 1,420,118 | 6/1922 | McAllister | 198—94 |
| 2,596,265 | 5/1952 | Manierre | 198—99 |
| 3,341,039 | 9/1967 | Cranage | 198—94 |

R. E. AEGERTER, Primary Examiner

U.S. Cl. X.R.

198—94; 214—8.5